US012730494B2

(12) United States Patent
Tsien

(10) Patent No.: US 12,730,494 B2
(45) Date of Patent: Sep. 8, 2026

(54) HETEROGENEOUS CHIPLET POWER MANAGEMENT

(71) Applicant: Advanced Micro Devices, Inc., Santa Clara, CA (US)

(72) Inventor: Benjamin Tsien, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 220 days.

(21) Appl. No.: 18/345,946

(22) Filed: Jun. 30, 2023

(65) Prior Publication Data

US 2025/0004540 A1 Jan. 2, 2025

(51) Int. Cl.
*G06F 1/3296* (2019.01)
*G06F 1/3234* (2019.01)

(52) U.S. Cl.
CPC .......... *G06F 1/3296* (2013.01); *G06F 1/3275* (2013.01)

(58) Field of Classification Search
CPC ........ G06F 1/3275; G06F 1/3296; G06F 1/26; G06F 1/3243; Y02D 100/00
USPC .......................................................... 713/323
See application file for complete search history.

(56) References Cited

U.S. PATENT DOCUMENTS 12,147,366 B2 * 11/2024 Tresidder ............ G06F 13/4004
12,164,365 B2 * 12/2024 Phan ..................... G06F 1/3228
2016/0048191 A1 2/2016 Machnicki et al.
2019/0108861 A1 4/2019 Tsien et al.
2019/0147926 A1 * 5/2019 Branover ................ G06F 1/325 327/158
2021/0133913 A1 5/2021 Matam et al.
2022/0413593 A1 * 12/2022 Kakkireni ............. G06F 1/3215
2023/0027585 A1 * 1/2023 Weng .................... H04L 45/745
2023/0059725 A1 2/2023 Sodhi et al.
2024/0219988 A1 * 7/2024 DeFiore ................ G06F 1/3209
2025/0004652 A1 * 1/2025 Tsien .................... G06F 3/0673

OTHER PUBLICATIONS

"Chiplet Technology and Heterogeneous Integration"—by Wendemagegnehu T. Beyene; 4 pages, Dated Apr. 2022 (Year: 2022).*
AMD Whitepaper—"AMD Chiplet Ecosystem"; 9 pages, dated Dec. 9, 2024 (Year: 2024).*
International Search Report and Written Opinion in PCT Application No. PCT/US2024/035909 mailed Oct. 21, 2024, by: Authorized Officer: Sung Hoon Kim.

* cited by examiner

*Primary Examiner* — Brian T Misiura
(74) *Attorney, Agent, or Firm* — Greenberg Traurig, LLP

(57) ABSTRACT

The disclosed device includes heterogeneous chiplets that can communicate when each of the heterogenous chiplets has locally reached an idle state. Once receiving confirmations of the idle state from each of the heterogenous chiplets, the chiplets can complete the entry of the low power state. Various other methods, systems, and computer-readable media are also disclosed.

20 Claims, 7 Drawing Sheets

HETEROGENEOUS CHIPLET POWER MANAGEMENT

BACKGROUND

Power management for processor architectures, such as a system-on-chip (SOC), often involve placing the SOC in a low power state. To place the SOC in the low power state, the various components within the SOC would synchronize to reach an idle state (e.g., a state of low or no activity) to allow power gating. For a monolithic SOC or SOC with a homogeneous chiplet architecture, having the various chiplets reach the idle state can follow similar processes. However, for a heterogeneous chiplet architecture, which can include a mix of chiplets having real-time traffic with other types of chiplets, coordinating the chiplets can be difficult.

BRIEF DESCRIPTION OF THE DRAWINGS

The accompanying drawings illustrate a number of exemplary implementations and are a part of the specification. Together with the following description, these drawings demonstrate and explain various principles of the present disclosure.

Figure 1:
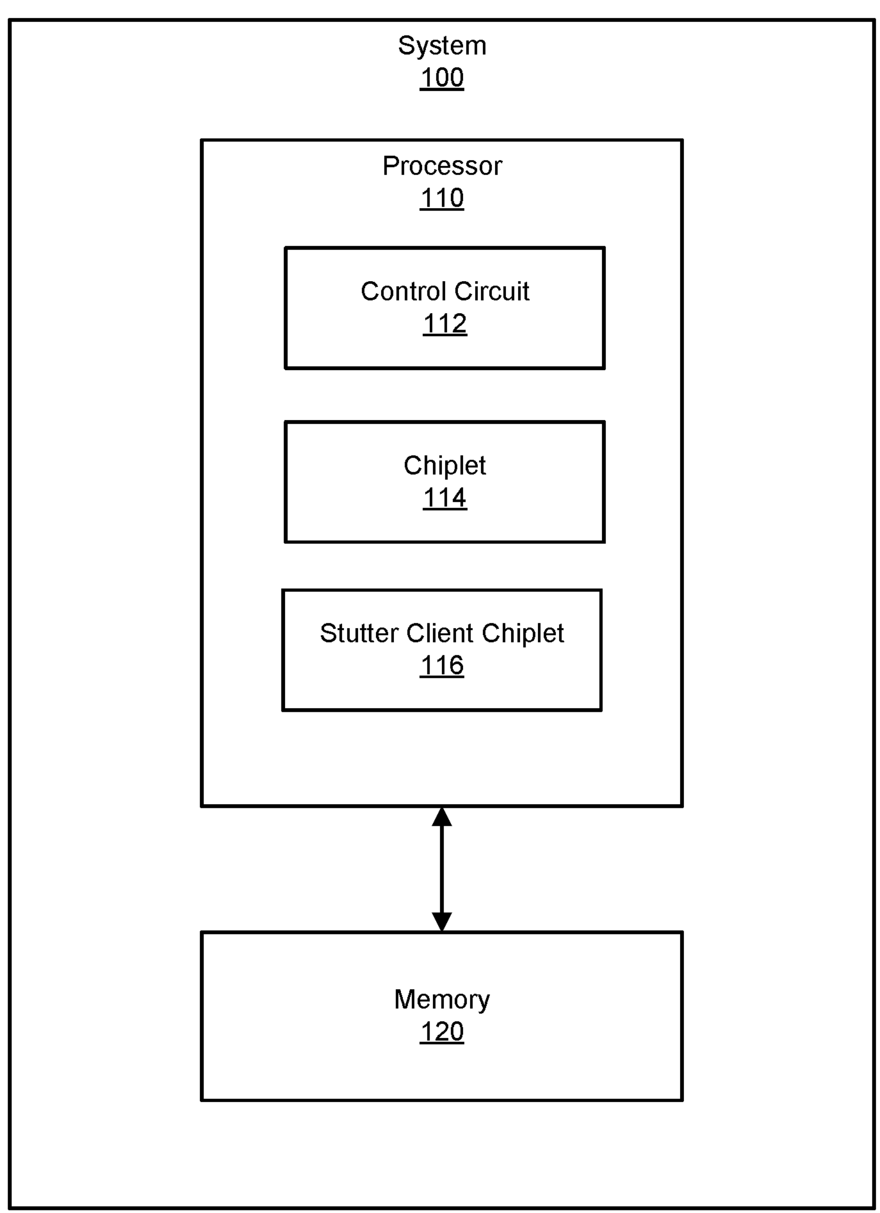
FIG. 1 is a block diagram of an exemplary system for heterogeneous chiplet power management.

Throughout the drawings, identical reference characters and descriptions indicate similar, but not necessarily identical, elements. While the exemplary implementations described herein are susceptible to various modifications and alternative forms, specific implementations have been shown by way of example in the drawings and will be described in detail herein. However, the exemplary implementations described herein are not intended to be limited to the particular forms disclosed. Rather, the present disclosure covers all modifications, equivalents, and alternatives falling within the scope of the appended claims.

DETAILED DESCRIPTION

The present disclosure is generally directed to heterogeneous chiplet power management. As will be explained in greater detail below, implementations of the present disclosure instruct heterogeneous chiplets to reach an idle state individually and locally in response to initiating entry of a low power state. After confirming that each chiplet is idle, the entry to the low power state can be completed. Advantageously, this allows stutter clients (e.g., chiplets that can perform in bursts of activity/data) to coordinate with other chiplets for low power states and/or partial low power states, enabling improved power management for heterogeneous chiplet architectures.

In one implementation, a device for heterogeneous chiplet power management includes a plurality of heterogeneous chiplets. A first chiplet of the plurality of heterogeneous chiplets is configured to report, to a second chiplet of the plurality of heterogeneous chiplets in response to receiving an indication of the device initiating entry of a low power state, locally reaching an idle state, and in response to receiving a confirmation of the idle state from the second chiplet, locally complete the entry of the low power state.

In some examples, the first chiplet corresponds to a stutter client chiplet having an activity buffer and locally reaching the idle state includes filling the activity buffer based on a buffer threshold. In some examples, the buffer threshold corresponds to a minimum idle period before the at least one chiplet wakes up to refill the activity buffer. In some examples, the stutter client chiplet corresponds to a display engine and the activity buffer corresponds to a display buffer. In some examples, the stutter client chiplet corresponds to a multimedia engine and the activity buffer corresponds to a multimedia buffer.

In some examples, the stutter client chiplet is configured to receive an indication of the device transitioning to a partial power state in which a subset of logic components of the stutter client chiplet is active to allow filling the activity buffer, and wherein other chiplets of the plurality of heterogenous chiplets remain idle. In some examples, the plurality of heterogeneous chiplets are configured to abort, in response to at least one of the plurality of heterogeneous chiplets broadcasting an active state, transitioning to the partial power state while the stutter client chiplet is filling the activity buffer.

In some examples, locally reaching the idle state comprises at least one of saving a state, disabling write burst accumulation, flushing remaining writes. In some examples, the plurality of heterogeneous chiplets are configured to abort the entry of the low power state in response to at least one of the plurality of heterogeneous chiplets broadcasting an active state.

In one implementation, a system for heterogeneous chiplet power management includes a plurality of heterogeneous chiplets including a stutter client having an activity buffer, and a control circuit configured to, in response to the system initiating entry of a low power state, confirm each of the plurality of heterogenous chiplets has locally reached an idle state, in response to receiving confirmations of the idle state from each of the plurality of heterogenous chiplets, instruct the stutter client to fill the activity buffer to a buffer threshold, and in response to the stutter client filling the activity buffer, complete the entry of the low power state.

In some examples, the buffer threshold corresponds to a minimum idle period before the stutter client wakes up to refill the activity buffer. In some examples, refilling the activity buffer further comprises accessing a memory of the system. In some examples, the stutter client corresponds to a display engine and the activity buffer corresponds to a display buffer. In some examples, the stutter client corresponds to a multimedia engine and the activity buffer corresponds to a multimedia buffer.

In some examples, the control circuit is configured to receive an indication of a partial power state in which only components servicing the stutter client is active, and in response to the indication, instructing the stutter client and a corresponding link to power on, wherein other chiplets of the plurality of heterogenous chiplets remain idle. In some examples, the control circuit is configured to, in response to at least one of the plurality of heterogeneous chiplets broadcasting an active state, abort the partial power state. In some examples, the control circuit is configured to abort, in response to at least one of the plurality of heterogeneous chiplets broadcasting an active state, entry of the low power state.

In one implementation, a method for heterogeneous chiplet power management includes (i) transitioning a plurality of heterogeneous chiplets to a new power state that corresponds to power gating idle chiplets of the plurality of heterogeneous chiplets, (ii) confirming, while a stutter client chiplet of the plurality of heterogeneous chiplets is kept at least partially powered on, the idle chiplets have completed operations for reaching an idle state, and (iii) in response to confirmations from the idle chiplets of the idle state, completing the transition to the new power state.

In some examples, the stutter client chiplet has an activity buffer and the stutter client chiplet is kept at least partially powered on to fill the activity buffer to at least a buffer threshold. In some examples, the method includes aborting the transition to the new power state while the stutter client chiplet fills the activity buffer. In some examples, the operations includes at least one of confirming corresponding local clients are idle, saving a state, flushing writes, disabling write burst accumulation, or confirming a corresponding fabric is idle.

Features from any of the implementations described herein can be used in combination with one another in accordance with the general principles described herein. These and other implementations, features, and advantages will be more fully understood upon reading the following detailed description in conjunction with the accompanying drawings and claims.

The following will provide, with reference to FIGS. 1-5, detailed descriptions of heterogeneous chiplet power management. Detailed descriptions of example systems or architectures will be provided in connection with FIGS. 1 and 2. Detailed descriptions of example transitions for heterogeneous chiplet power management will be provided in connection with FIGS. 3A-3C. Detailed descriptions of an example work flow for heterogeneous chiplet power management will be provided in connection with FIG. 4. Detailed descriptions of corresponding methods will also be provided in connection with FIG. 5.

FIG. 1 is a block diagram of an example system 100 for heterogeneous chiplet power management. System 100 corresponds to a computing device, such as a desktop computer, a laptop computer, a server, a tablet device, a mobile device, a smartphone, a wearable device, an augmented reality device, a virtual reality device, a network device, and/or an electronic device. As illustrated in FIG. 1, system 100 includes one or more memory devices, such as memory 120. Memory 120 generally represents any type or form of volatile or non-volatile storage device or medium capable of storing data and/or computer-readable instructions. Examples of memory 120 include, without limitation, Random Access Memory (RAM), Read Only Memory (ROM), flash memory, Hard Disk Drives (HDDs), Solid-State Drives (SSDs), optical disk drives, caches, variations, or combinations of one or more of the same, and/or any other suitable storage memory.

As illustrated in FIG. 1, example system 100 includes one or more physical processors, such as processor 110. Processor 110 generally represents any type or form of hardware-implemented processing unit capable of interpreting and/or executing computer-readable instructions. In some examples, processor 110 accesses and/or modifies data and/or instructions stored in memory 120. Examples of processor 110 include, without limitation, chiplets (e.g., smaller and in some examples more specialized processing units that can coordinate as a single chip), microprocessors, microcontrollers, Central Processing Units (CPUs), graphics processing units (GPUs), Field-Programmable Gate Arrays (FPGAs) that implement softcore processors, Application-Specific Integrated Circuits (ASICs), systems on chip (SoCs), digital signal processors (DSPs), Neural Network Engines (NNEs), accelerators, graphics processing units (GPUs), portions of one or more of the same, variations or combinations of one or more of the same, and/or any other suitable physical processor.

As further illustrated in FIG. 1, processor 110 includes a control circuit 112, a chiplet 114, and a stutter client chiplet 116. Control circuit 112 generally corresponds to circuitry and/or instructions for performing at least certain aspects of power management, such as monitoring for entry/exit conditions of power states, coordinating or otherwise facilitation communication between components (e.g., chiplet 114 and/or stutter client chiplet 116) for entry/exit, etc. Chiplet 114 generally corresponds to one or more chiplets.

Stutter client chiplet 116 generally corresponds to one or more chiplets having components or clients that can stutter (e.g., perform certain activity and/or data requests in bursts in between stutter or low activity periods). Stutter client chiplet 116 can include an activity buffer which, when filled with data, allows stutter client chiplet 116 to operate at low activity for a period of time (e.g., as the buffer is drained) without making data requests to a memory (e.g., memory 120) or otherwise generate new data for the buffer. If the buffer is sufficiently filled (e.g., to a watermark or buffer threshold level), stutter client chiplet 116 can operate for a minimum idle period before reaching a critical level when the remaining unconsumed data reaches a low watermark specified by a time to underflow (e.g., reaching a blackout state), which requires the buffer to be refilled, for instance by waking up stutter client chiplet 116. In some examples, the activity buffer can store data generated by an I/O device or internally in the client for writing to memory (e.g., memory 120) and the critical level corresponds to when data unwritten to memory reaches a high watermark specified by a time to overflow. In some examples, this write activity buffer can be actively managed by messaging (e.g., in response to fabric idle as described further below) or passive (e.g., as part of normal idle to active transitions). In some examples, the write activity buffer can store data captured by a camera/webcam for writing to memory. In addition, some non-limiting examples of stutter client chiplet 116 include a graphics or display engine (e.g., for rendering frames for display that are saved in a display buffer as the activity buffer), and a multimedia engine (e.g., for decoding/rendering frames and/or audio saved in a multimedia buffer as the activity buffer).

An idle state can correspond to a low or no activity state and in some examples, corresponds to a state having no external data requests (e.g., memory access requests to memory 120) such that corresponding links are unused and can be power gated. In some implementations, the various chiplets and components of processor 110 (e.g., chiplet 114 and stutter client chiplet 116) can have various respective local conditions for reaching the idle state. In some examples, locally reaching the idle state can include saving a state, such as chiplet 114 saving its context or state in order to be restored when exiting the low power state. In some examples, locally reaching the idle state includes accumulating write requests, such as chiplet 114 accumulating its write requests to memory 120 or other data storage. In other examples, locally reaching the idle state includes filling an activity buffer to a buffer threshold, such as stutter client chiplet 116 filling its activity buffer.

For heterogeneous chiplets such as chiplet 114 and stutter client chiplet 116, processor 110 is not easily able to initiate multi-chiplet idle procedures due to variances (e.g., for reaching idle states) of the chiplets. For instance, due to high variance between chiplets and components entering the idle state, stutter client chiplet 116 can enter the blackout state while waiting for the rest of processor 110 to enter the low power state, negatively impacting performance as well as a user experience. Control circuit 112 can therefore be configured to coordinate the heterogeneous chiplets via a messaging protocol, which in some examples includes coordinating and/or initiating messages between chiplets, although in other examples the chiplets can broadcast messages and wait for acknowledgements. For instance, in response to processor 110 initiating entry of a low power state, control circuit 112 confirm that each of the heterogenous chiplets (e.g., chiplet 114 and stutter client chiplet 116) have locally reached an idle state. Then, in response to receiving confirmations of the idle state from each of the heterogenous chiplets (e.g., in accordance with the protocol), control circuit 112 can complete or facilitate the entry of the low power state.

Figure 2:
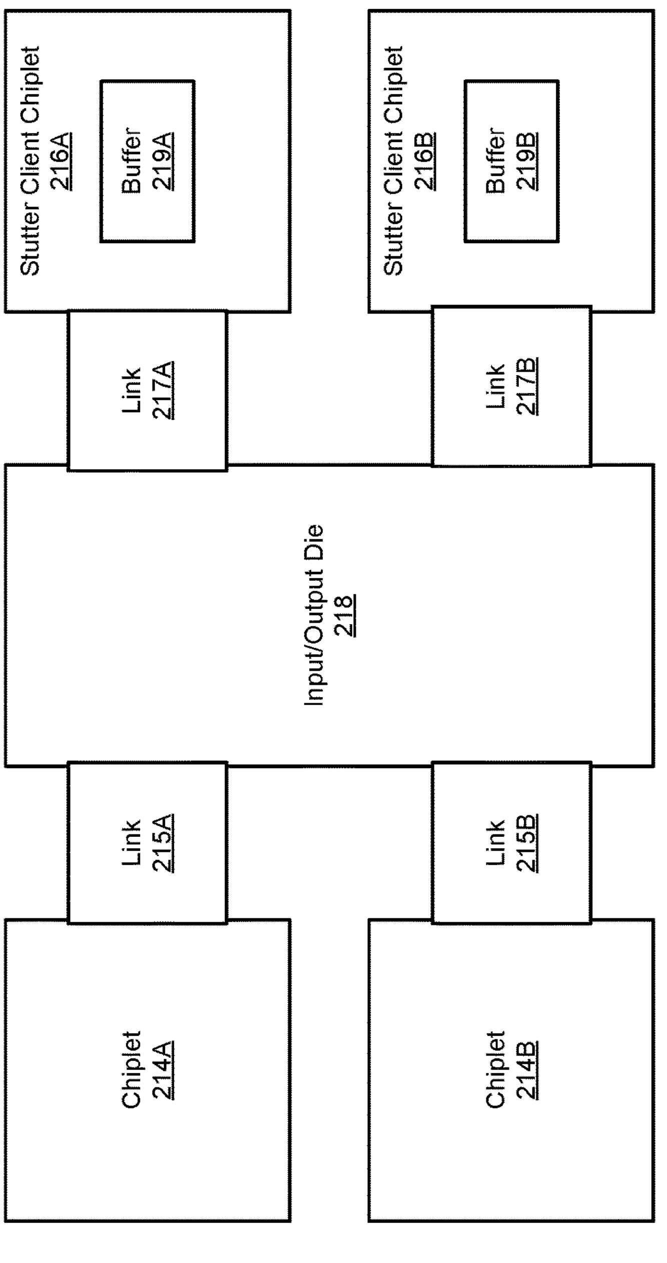
FIG. 2 is a block diagram of an exemplary architecture for heterogeneous chiplets.

FIG. 2 illustrates an SOC 210, corresponding to processor 110, having a heterogeneous chiplet architecture. As illustrated in FIG. 2, SOC 210 includes a chiplet 214A and a chiplet 214B, each corresponding to iterations of chiplet 114. SOC 210 also includes a stutter client chiplet 216A and a stutter client chiplet 216B, each corresponding to iterations of stutter client chiplet 116. Each stutter client can include an activity buffer, such as stutter client chiplet 216A having a buffer 219A and stutter client chiplet 216B having a buffer 219B. SOC 210 further includes an input/output (I/O) die 218, which can coordinate I/O of the various chiplets (e.g., chiplets 214A-214B and stutter client chiplets 216A-216B) via a link 215A, a link 215B, a link 217A, and a link 217B, each of which correspond to links for sending data/signals between the chiplets and I/O die 218. In some implementations, I/O die 218 can incorporate or otherwise communicate with a control circuit such as control circuit 112.

SOC 210 can transition between various power states, such as various degrees of low power states in which the components of SOC 210 are in low power states, partial power states in which some components are in low power and/or idle while others are active, and full power states in which the components are active. Thus when SOC 210 transitions from a current power state to a new power state, based on exit conditions of the current power state and/or entry conditions of the new power state, certain components can be powered off, put into idle or otherwise put into a lower power state, certain components can be powered on, made active or otherwise put into a higher power state, and certain components can remain in the same power state.

In some examples, SOC 210 can transition into a low power state that includes different types of chiplets reaching the idle state, such as chiplet 214A and/or chiplets 214B along with stutter client chiplet 216A and/or stutter client chiplet 216B. The control circuit can confirm chiplet 214A and/or chiplet 214B have locally reached the idle state, for example using a messaging protocol described herein in which chiplets can send acknowledgements of local clients and/or corresponding fabric being idle. In some implementations, the waiting for each respective chiplet to reach a sufficiently idle state can reduce variance and latency of entering the low power state to a more predictable latency. For instance, each chiplet can achieve idle for its local clients and prepare for low power entry (e.g., saving state, disabling write burst, flushing writes) while the corresponding fabric achieves idle. Waiting for fabric idle can be necessary because writes can persist in the fabric without knowledge of the clients that sent them if they are posted by the fabric to write to memory after reaching global observability, or otherwise posted into the fabric upon arrival. Once confirming fabric idle, the control circuit can negotiate an idle state for stutter client chiplet 216A and/or stutter client chiplet 216B by providing an appropriate buffer threshold for stutter client chiplet 216A to fill buffer 219A and/or stutter client chiplet 216B to fill buffer 219B. In some examples, only a single stutter client (e.g., a stutter client of stutter client chiplet 216A) can have an actively managed activity buffer in response to fabric idle. In some examples, only stutter clients of a single stutter client chiplet (e.g., stutter clients of stutter client chiplet 216A) can have actively managed activity buffers in response to fabric idle. In some examples, stutter client chiplets without such actively managed activity buffers can have passive activity buffers that are triggered to fill when they reach a critical level, forcing the system to an active state, are filled upon the system's normal exit from idle to active state, or are filled upon a local chiplet transition from active to idle. In some examples, a video codec engine can support a passive activity buffer as described.

Once chiplet 214A locally reaches its idle state, chiplet 214A can communicate, by sending a confirmation to the control circuit, that it reached the idle state. Similarly, stutter client chiplet 216A can communicate, by sending a confirmation to the control circuit, that it reached the idle state. In response the receiving all confirmations (e.g., expected confirmations in response to the instructions sent), the control circuit can complete entry of the low power state, which can include various powering down of other components of SOC 210 as needed, such as link 215A (as chiplet 214A is idle) and link 217A (as stutter client chiplet 216A is idle) as well as other actions with respect to multiple chiplets, common or shared resources/components across SOC 210, corresponding portions of a data fabric and other interfaces, etc. Although not illustrated in FIG. 2, additional actions can include power gating, clock gating, etc. as needed.

In some examples, SOC 210 can transition to a partial power state. For example, stutter client chiplet 216A can, after exhausting or nearly exhausting buffer 219A, can be powered on from a low power state for refilling its buffer whereas chiplet 214A can remain idle. Accordingly, the control circuit can instruct stutter client chiplet 216A, along with link 217A, to power back on and become active. In other examples, one or more chiplet (e.g., one or more of chiplets 214A-214B and/or stutter client chiplets 216A-216B) can transition to the partial power state, in which a subset of logic components/clients of the chiplet are powered on. For instance, logic components servicing the stutter client can be powered on while components (e.g., additional interfaces, crossbars, links, probe filters, shadow tag management components of other caches that have been flushed, private caches of other clients, and other components not used by the stutter client) can remain powered down.

In yet other examples, SOC 210 can transition between power states with the control circuit instructing components to power on or off as needed in parallel, by instructing local actions with respect to each chiplet/component, receiving confirmation of completion of the local actions, and completing the transition with respect to actions across SOC 210, as described herein. In further examples, rather than having a control circuit the chiplets can send indications/communications amongst the chiplets, and respond accordingly, as described further with respect to FIGS. 3A-3C.

Figure 3A:
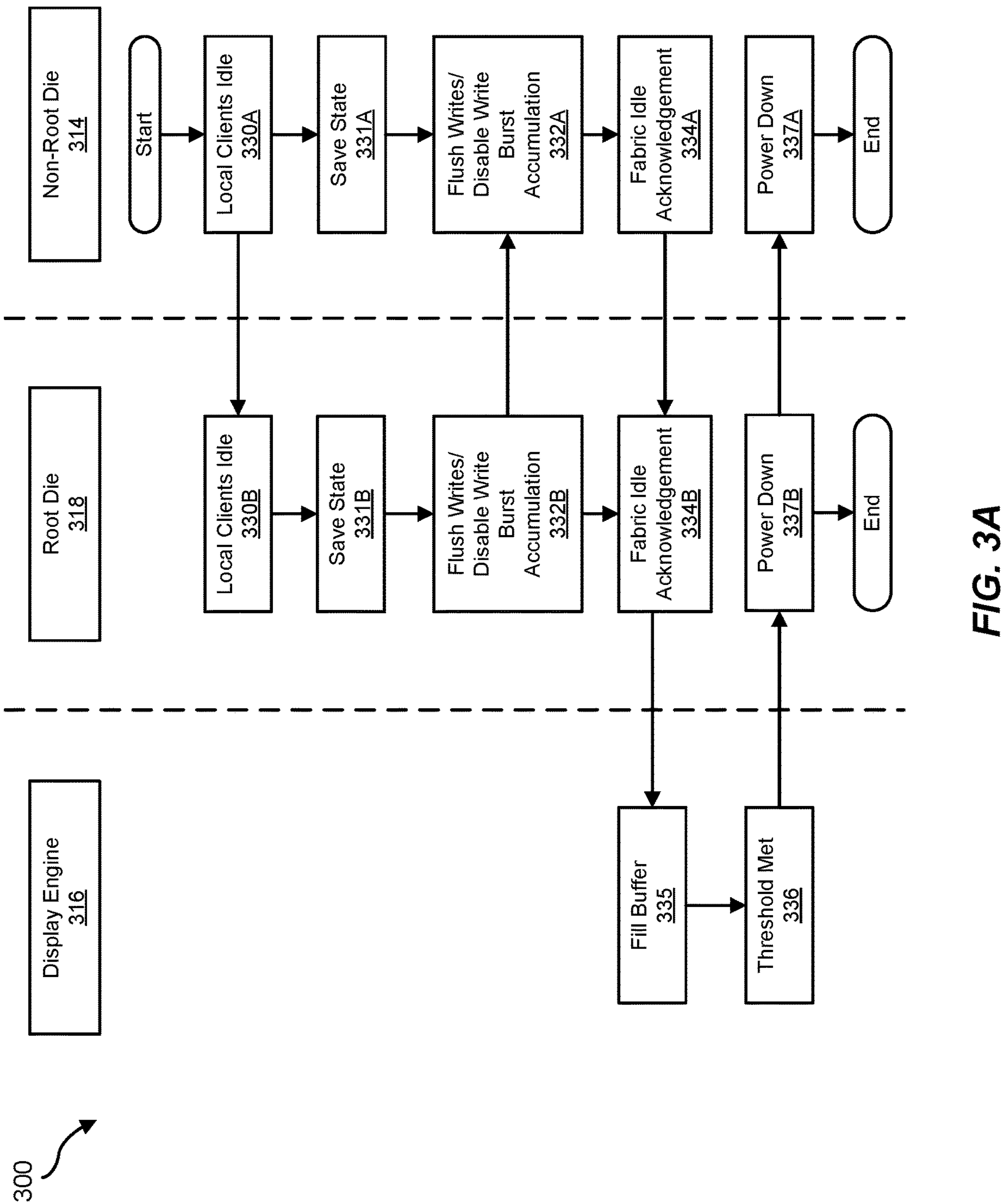
FIGS. 3A-C are block diagrams of exemplary workflows for heterogeneous chiplet power management.
Figure 3B:
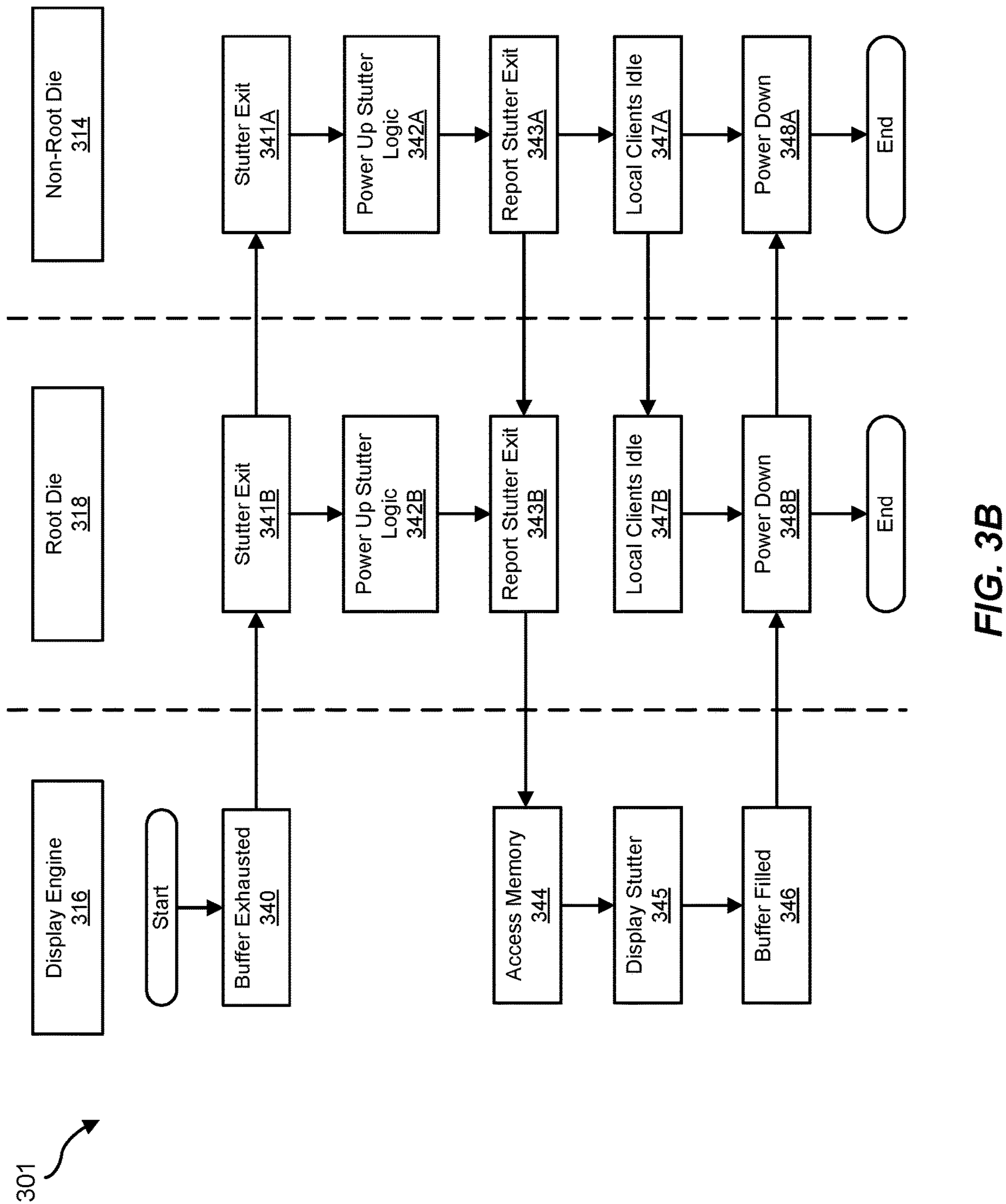
Figure 3C:
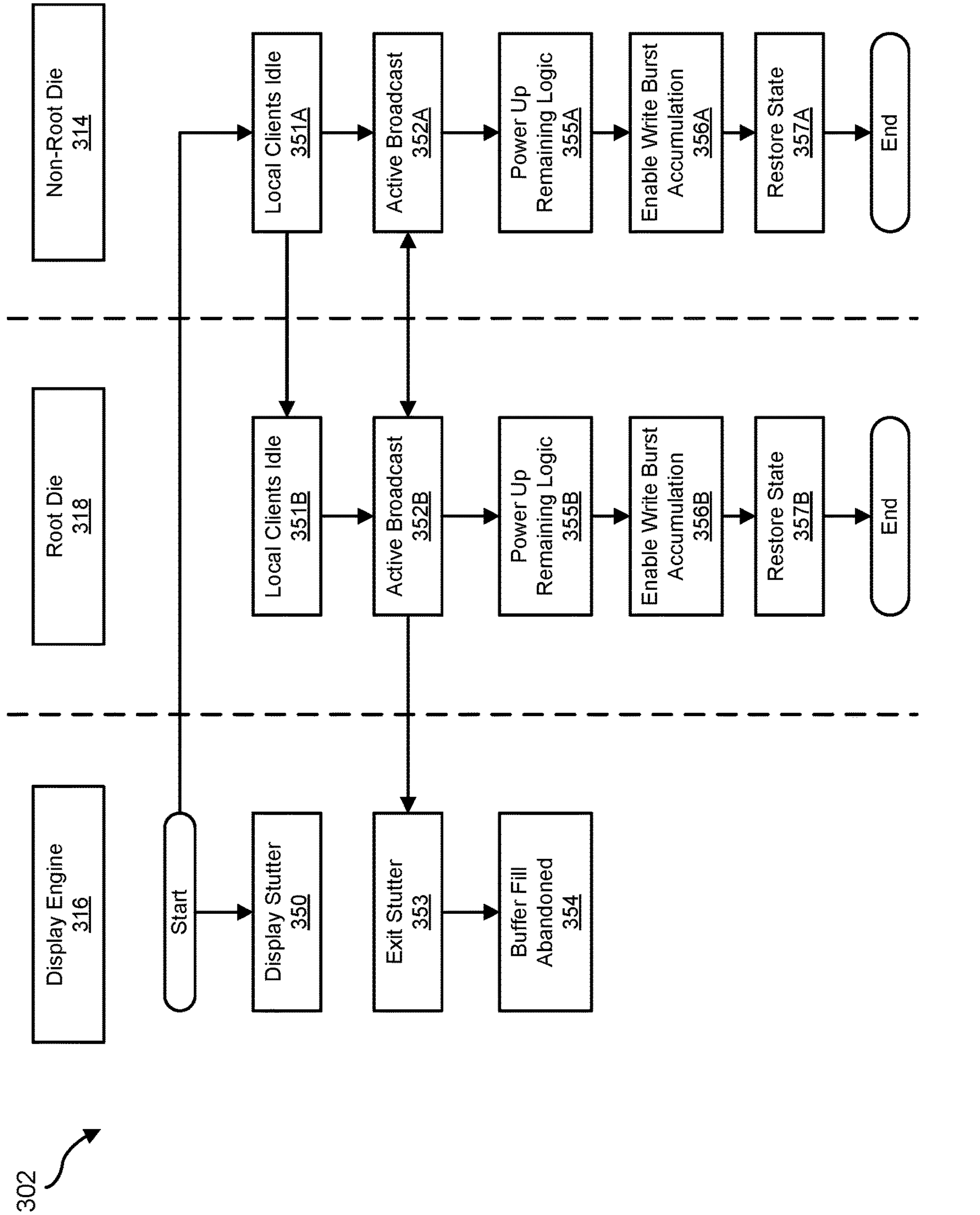

FIG. 3A-3C respectively illustrate a chart 300, a chart 301, and a chart 302 including a display engine 316 corresponding to stutter client chiplet 216A (and/or stutter client chiplet 116), a root die 318 corresponding to I/O die 218

(and/or another root die), and a non-root die 314 corresponding to chiplet 214A (and/or chiplet 114 or any other non-root or leaf die). FIGS. 3A-3C illustrate simplified examples, and in other examples, additional chiplets, levels of chiplets, and/or interfaces/fabrics can further be included. In addition, FIGS. 3A-3C illustrate chiplets having underlying state machines for transitioning between the various illustrated states and in some examples, the underlying state machines can be similar or the same across the chiplets.

FIG. 3A corresponds to low power entry across heterogeneous chiplets.

Because a display controller (e.g., a display engine 316) can require a separate negotiation of going to stutter mode to then become idle, reaching idle (e.g., of local clients) can exclude the display controller. Accordingly, non-root die 314 can start with broadcasting local clients idle 330A followed by save state 331A. Root die 318 can receive the indication of local clients idle 330A, and reach local clients idle 330B along with save state 331B. In some examples, local clients idle 330A and/or local clients idle 330B can be differentiated from direct entry to a partially powered stutter level for a stutter client. Root die 318 can further proceed with flush writes/disable write burst accumulation 332B (e.g., flushing writes in the fabric and memory controller and disabling write burst accumulation in the memory controller), the completion of which is broadcast to non-root die 314, while non-root die 314 can proceed to perform flush writes/disable write burst accumulation 332A (e.g., including similar corresponding actions as flush writes/disable write burst accumulation 332B). After non-root die 314 completes flush writes/disable write burst accumulation 332A, non-root die 314 can send fabric idle acknowledgement 334A of locally reaching its idle state (e.g., having its local clients idle as well as corresponding fabric idle without persisting writes) to root die 318. Root die 318 can send fabric idle acknowledgement 334B of locally reaching its idle state to display engine 316 (indicating root die 318 and non-root die 314 locally reaching idle states). Display engine 316 can begin fill buffer 335 of filling its display buffer based on a buffer threshold until threshold met 336. Display engine 316 can broadcast threshold met 336 (e.g., indicating locally reaching its idle state) to root die 318 to begin power down 337B which can include power gating and other related steps (e.g., fabric and memory controller power/clock gating, DRAM low power state, voltage regulator low current state, powering down chiplet links, powering down a phase-locked loop (PLL), and/or clock tree frequency reduction for example via bypass to a slower reference clock or clock tree gating). Root die 318 can further broadcast power down 337B to non-root die 314 to begin power down 337A (e.g., having similar corresponding actions as power down 337B) to complete entry to the low power state.

FIG. 3B corresponds to display stutter across heterogeneous chiplets, for example when at a low power state. Display engine 316 can detect buffer exhausted 340 (e.g., that its activity buffer is exhausted and will need to exit stutter) which is broadcast to root die 318. Root die 318 can locally initiate stutter exit 341B, including power up stutter logic 342B and report stutter exit 343B. Root die 318 can also broadcast stutter exit 341B to non-root die 314 to locally initiate stutter exit 341A, including power up stutter logic 342A and report stutter exit 343A. Non-root die 314 can broadcast report stutter exit 343A to root die 318, which can further broadcast report stutter exit 343B to display engine 316. Display engine 316 can access memory 344, for example to refill its buffer at display stutter 345. Non-root die 314 can also prepare local clients idle 347A (e.g., corresponding to local clients idle 330A), which is broadcast to root die 318 to prepare local clients idle 347B (e.g., corresponding to local clients idle 330B). The local clients idle states (e.g., local clients idle 347A and local clients idle 347B) can indicate that the local chiplet is idle, except for display, and thus ready to negotiate a watermark (e.g., for the buffer) with display engine 316. Root die 318 can further proceed to power down 348B and non-root die 314 can proceed to power down 348A. Display engine 316 can continue until buffer filled 346, which is broadcast to root die 318 for further initiating power down 348B, including various actions for powering down (e.g., similar to power down 337B). Root die 318 can also broadcast power down 348B to non-root die 314 to initiate power down 348A, including various actions for powering down (e.g., similar to power down 337A).

Power up stutter logic (e.g., power up stutter logic 342A and/or power up stutter logic 342B) can correspond to signaling partial power states for handling power efficient stutter. For example, display stutter (e.g., display stutter 345) can require only powering up portions of the data fabric responsible for display, which in some examples can exclude certain controllers, interface logic (e.g., for non-stutter clients), links (e.g., links statically allocated for other clients, links that can be selectively powered off in response to powering off related components), and/or clocks used by non-stutter clients and/or power gates for the non-stutter clients.

FIG. 3C corresponds to stutter exit, across heterogeneous chiplets, that can upgrade to low power exit. Display engine 316 can be at display stutter 350 (e.g., display stutter 345), root die 318 at local clients idle 351B (e.g., local clients idle 330B and/or local clients idle 347B), and non-root die 314 at local clients idle 351A (e.g., local clients idle 330A and/or local clients idle 347A). An incoming event of non-root die 314 can trigger active broadcast 352A, which can be sent to root die 318 as active broadcast 352B, further propagated to display engine 316 to exit stutter 353. In the example scenario represented by FIG. 3C, active broadcast 352A and/or active broadcast 352B can be triggered by various events. For example, active broadcast 352A can be triggered by non-root die 314 becoming active while root die 318 remains idle. In another example, active broadcast 352B can be triggered by root die 318 becoming active while non-root die 314 remains idle, in which case active broadcast 352B can be sent to non-root die 314. In another example, both root die 318 and non-root die 314 can become idle at the same or nearly the same time, such that the respective active broadcast messages are sent to each other.

Display engine 316 can proceed to buffer fill abandoned 354, during which having display engine 316 fill its activity buffer is no longer necessary due to exiting low power. For instance, display engine 316 can receive normal access to memory until the next low power entry, when the requirement to fill the activity buffer can be reinstated. Meanwhile, root die 318 can proceed to power up remaining logic 355B, which can include powering up components for a complete low power exit, as stutter logic has already been powered up prior to this point (e.g., for allowing display stutter 350 during local clients idle 351B). Non-root die 314 can similarly to power up remaining logic 355A, which similarly includes powering up remaining components for a complete low power exit. After power up remaining logic 355B, root die 318 can continue with enable write burst accumulation 356B, non-root die 314 can continue with enable write burst accumulation 356A. Non-root die 314 can proceed to restore state 357A, and root die 318 can proceed to restore state 357B, to complete exiting the low power state.

As illustrated in FIG. 3C, a further (non-stutter) low power exit condition seen can cause "Active" to be signaled that leads to all remaining logic to exit low power. In some implementations, multiple stutter levels can be implemented. In some examples, a multimedia exit can be differentiated from display stutter and can be indicated (e.g., instead of stutter exit 341B and/or stutter exit 341A) to enter a different partially powered state. Exit can then be transitioned from deeper to shallower states, for instance, from low power to display stutter to multimedia stutter to low power exit, directly from low power to multimedia to low power exit, and/or directly from low power to low power exit, as well as other transitions between deeper and shallower states.

FIGS. 3A-3C describe a simplified communication flow amongst display engine 316, root die 318, and non-root die 314 in a simplified example architecture. In some examples, particularly with additional iterations/variations of non-root die 314, root die 318, and/or display engine 316, including additional levels of non-root die 314 branching from root die 318, certain actions can be modified as needed. For instance, certain reports can be bypassed over certain dies (e.g., if a particular non-root die 314 lies along a branch that has completed its activity and does not need further coordination), and/or a control circuit can directly receive certain reports.

Figure 4:
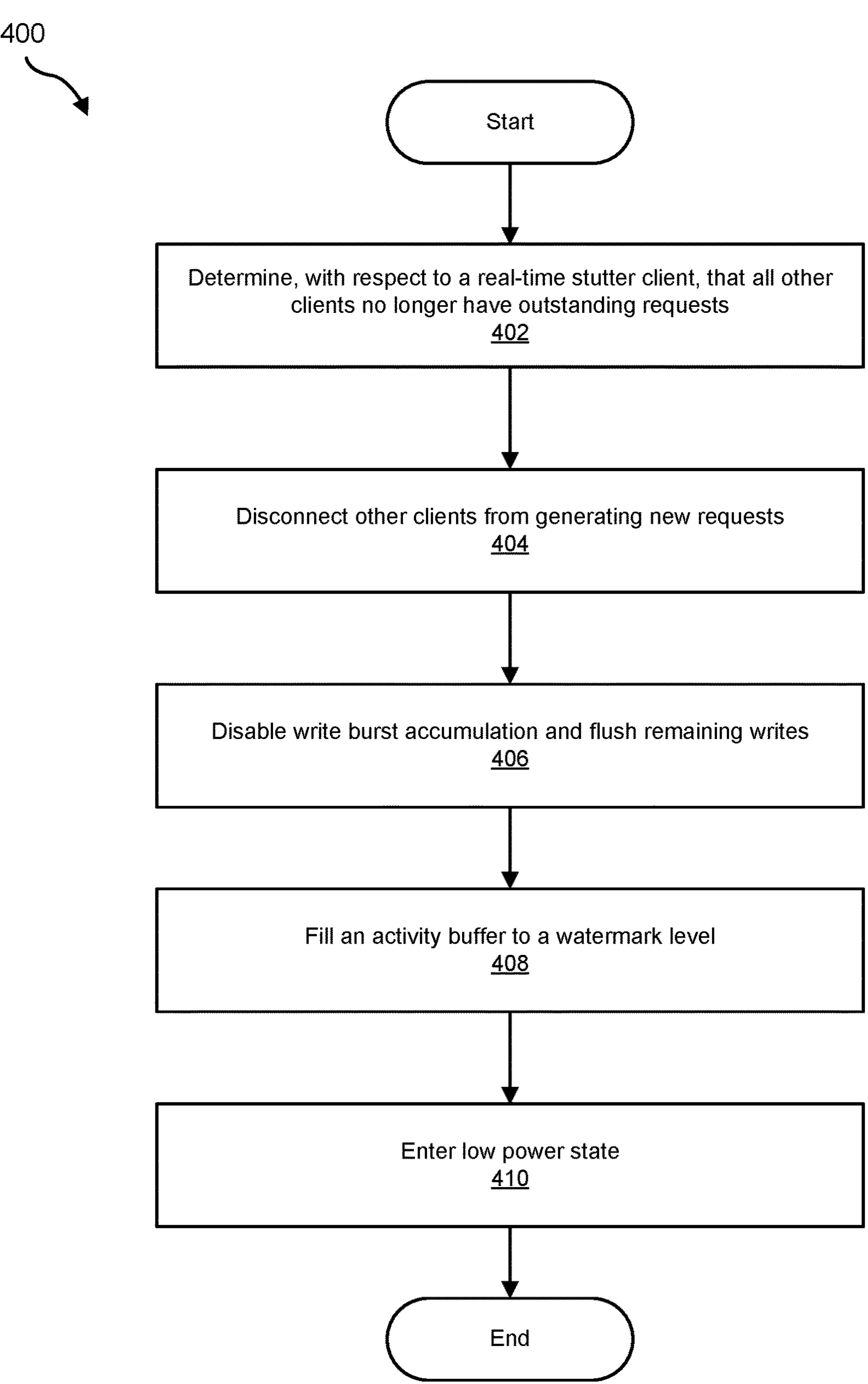
FIG. 4 is a flow diagram of another exemplary workflow for heterogeneous chiplet power management.

FIG. 4 is a flow diagram of an exemplary workflow 400 for heterogeneous chiplet power management. In some implementations, a quality-of-service (Qos) protocol maintains guarantees that allows real-time stutter clients to manage their activity buffers. FIG. 4 illustrates another example of managing a real-time stutter client (e.g., stutter client chiplet 116). At 402, it can be determined that all other clients, with respect to the real-time stutter client, no longer have outstanding requests (e.g., local clients idle 330A and local clients idle 330B) in that all reads that have received read responses and writes have met global observability as defined by a coherence protocol (e.g., for a corresponding data fabric or other interface for ensuring data is not stale) or otherwise becoming posted in a relevant network. In some examples, with multiple chiplets, 402 can be performed using a protocol that specifies idle to a root die where the real-time stutter client exists, via hierarchical propagation.

At 404, other clients can be disconnected from generating new requests. In some examples, 404 can be distributed/performed across each die as the messaging for 402 is performed.

At 406, write burst accumulation can be disabled (e.g., flush writes/disable write burst accumulation 332B and flush writes/disable write burst accumulation 332A), and remaining writes flushed (e.g., past a global observability or posted in network) in the data fabric and/or memory controller to DRAM such as memory 120 (e.g., flush writes/disable write burst accumulation 332B and flush writes/disable write burst accumulation 332A). In some examples, 406 can be initiated by a protocol triggering a multi-chiplet low power attempt after the root die receives messaging (e.g., at 402) from all other dies while locally idle in non-stutter clients. In some examples, this results in leaf to root propagation indicating completion (e.g., fabric idle acknowledgement 334B and fabric idle acknowledgement 334A).

At 408, negotiating with the real time stutter client allows filling its activity buffer to a watermark level in which the stutter client completes outstanding requests and stops generating new requests (e.g., fill buffer 335 and threshold met 336). Additionally, by 408, the entire fabric on multiple chiplets can be quiesced of reads and writes of other clients (e.g., due to the messaging) such that the activity buffer filling can be done at the best QoS, with no traffic from other clients (e.g., similar to a monolithic die) to maximize the utilization efficiency of the activity buffer. In addition, once the real-time stutter client completes all outstanding requests at the best service, the entire fabric and memory controller can be completely idle and all traffic has been pre-flushed, allowing a fastest possible low power entry. Thus, the watermark or threshold (e.g., threshold met 336) buffer level needed to start powering down can correspond to idle fabric low power entry latency and exit latency (e.g., similar to what would be needed on a monolithic die). In other words, the protocol defined herein can hide multi-chiplets with distributed clients and chiplet-crossing traffic from the stutter client, such that activity buffer management performs similarly to a monolithic die.

At 410, entering a low power state (e.g., power down 337B and power down 337A) can include powering off idle data fabric components and memory controllers and putting DRAM in a low power state (e.g., self-refresh). In some examples, entering the low power state can further include powering down chiplet links and other components as described herein.

Moreover, messaging steps across chiplets, as described herein, can in some examples take an unspecified amount of latency. For instance, activity buffer filling can take a long time, as long as flushing in other chiplets. For QoS reasons, multi-chiplet messaging can in some examples detect a request by any client in any chiplet to return to active state and use the messaging protocol to abort the sequence, rather than having to wait for the entire entry to complete and exit. This messaging can be done by reversing the "local idle," such that any chiplet wanting to abort can send/broadcast "Active" (e.g., active broadcast 352B and active broadcast 352A) to other chiplets to return all chiplets to active state any time prior to the actual irreversible power down (e.g., in power down 337B and power down 337A). Once aborted, 404 (e.g., disconnecting clients) can be undone such that any client can generate new traffic. Any changes made prior to the abort, such as write burst accumulation disable can also be reversed.

Figure 5:
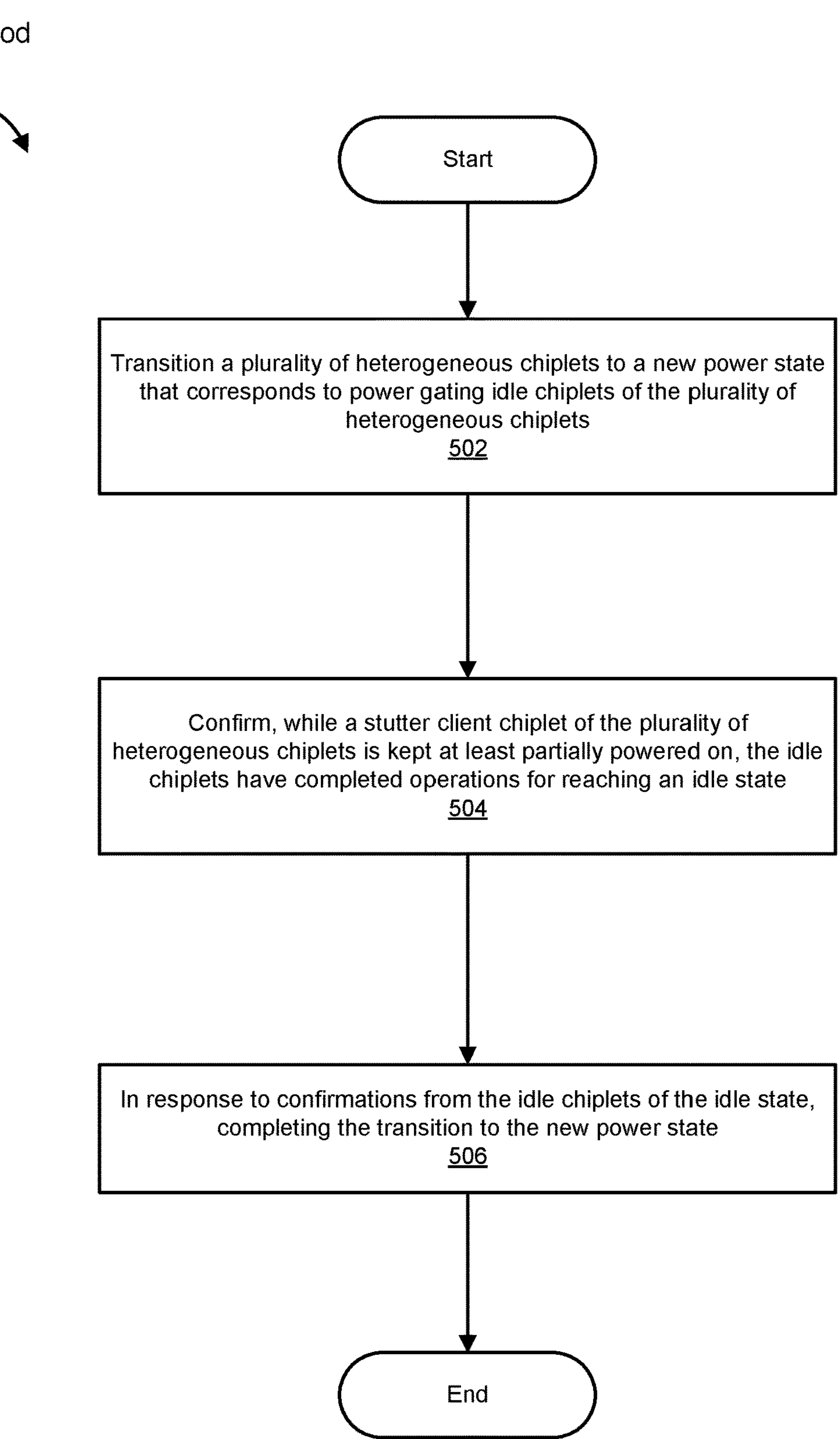
FIG. 5 is a flow diagram of an exemplary method for heterogeneous chiplet power management.

FIG. 5 is a flow diagram of an exemplary method 500 for heterogeneous chiplet power management. The steps shown in FIG. 5 can be performed by any suitable circuit and/or system, including the system(s) illustrated in FIGS. 1 and/or 2. In one example, each of the steps shown in FIG. 5 represent an algorithm whose structure includes and/or is represented by multiple sub-steps, examples of which will be provided in greater detail below.

As illustrated in FIG. 5, at step 502 one or more of the systems described herein transition a plurality of heterogeneous chiplets to a new power state that corresponds to power gating idle chiplets of the plurality of heterogeneous chiplets. For example, control circuit 112 can initiate and/or otherwise facilitate system 100 transitioning processor 110 to a new power state, such as a partial power state, that corresponds to power gating certain chiplets (e.g., chiplet 114).

The systems described herein can perform step 502 in a variety of ways. In one example, the new power state corresponds to a low power state with the idle chiplets including the plurality of heterogeneous chiplets. In another example, the new power state corresponds to a full power state with the active chiplets including the plurality of heterogenous chiplets. In another example, the new power state corresponds to a partial power state in which certain clients (e.g. stutter clients) and corresponding logic components can be kept powered on while other chiplets can be power gated.

At step 504, one or more of the systems described herein confirm, while a stutter client chiplet of the plurality of heterogeneous chiplets is kept at least partially powered on, the idle chiplets have completed operations for reaching an idle state. For example, control circuit 112 can confirm, chiplet 114 has completed high latency variance operations (e.g., confirming corresponding local clients are idle, saving a state, flushing writes, disabling write burst accumulation, and/or confirming a corresponding fabric is idle) while stutter client chiplet 116 is kept at least partially powered on.

The systems described herein can perform step 504 in a variety of ways. In some examples, the plurality of heterogenous chiplets includes a stutter client chiplet (e.g., stutter client chiplet 116) having an activity buffer and the stutter client chiplet is kept at least partially powered on to fill the activity buffer to at least a buffer threshold. In some examples, the transition to the new power state while the stutter client chiplet fills the activity buffer can be aborted (e.g., in response to a chiplet becoming/broadcasting active).

At step 506 one or more of the systems described herein complete, in response to confirmations from the idle chiplets of the idle state, the transition to the new power state. For example, control circuit 112 can complete the transition to the new power state after receiving confirmations from chiplet 114 and stutter client chiplet 116 of respectively reaching the idle state.

Low power state management schemes for multi-socket or multi-chiplet capable SOCs often do not cover real time client traffic crossing from one die to another. As detailed above, the systems and methods provided herein allow SOCs to be constructed with heterogeneous chiplets comprising of real time traffic clients that can send traffic across an arbitrary number of die hops to a remote memory to support a system-wide-state, while maintaining full stutter functionality enjoyed by a monolithic SOC. As described herein, in stutter mode, a chiplet can burst (filling up a buffer) and go idle (draining the buffer) to allow a low power state during the idle. For a heterogeneous chiplet architecture, a system-wide low power state requires coordination across the various chiplets, which can include real time traffic clients. Due to the variance across dies, coordination can require a protocol.

In other words, the messaging protocol described herein allows high latency variance operations (e.g., of non-display chiplets) to be completed before a display buffer fill operation in order to provide good QoS service and fast low power entry that can significantly improve activity buffer efficiency.

The systems and methods provided herein include, for example, a messaging protocol, a chiplet link power off, and fabric low power state transitions to allow multiple clock and power gating domains to be created in chiplets and optimized for low power stutter operations where multiple chiplets can coordinate partial low power transitions between normal operating mode and the stutter mode where logic not used by these stutter clients even in remote chiplets can be powered off.

The messaging protocol can be designed in consideration of hard real time clients such that chiplet messaging can be overlayed on top of the low power entry and exit sequences. Entry latency differences across multiple chiplets, such as latency from state saving, write burst disabling, and write flushing are not passed on to the real time stutter client's memory blackout watermark. In addition, power transitions can be parallelized across chiplets to minimize blackout.

The protocol described herein allows for coordination across all dies. When entering the low power state, each die can perform high variance actions locally (e.g., saving states, bursting out as needed) in order to quickly reach an idleness point for all dies. The dies communicate when complete, to proceed with other entry components (clock gating, power gating, clock tree gating, self-refresh, etc.) to enter the low power state. When exiting, this protocol allows for a partial power up of stutter clients (e.g., bursting again), turning on, for example, what is needed for display, multimedia, interface, etc. The exit condition can upgrade to a higher exit condition (e.g., full system-wide power up) or can downgrade back to low power (e.g., shutting off the stutter clients).

As detailed above, the circuits, devices, and systems described and/or illustrated herein broadly represent any type or form of computing device or system capable of executing computer-readable instructions, such as those contained within the modules described herein. In their most basic configuration, these computing device(s) each include at least one memory device and at least one physical processor.

In some examples, the term "memory device" generally refers to any type or form of volatile or non-volatile storage device or medium capable of storing data and/or computer-readable instructions. In one example, a memory device stores, loads, and/or maintains one or more of the modules and/or circuits described herein. Examples of memory devices include, without limitation, Random Access Memory (RAM), Read Only Memory (ROM), flash memory, Hard Disk Drives (HDDs), Solid-State Drives (SSDs), optical disk drives, caches, variations, or combinations of one or more of the same, or any other suitable storage memory.

In some examples, the term "physical processor" generally refers to any type or form of hardware-implemented processing unit capable of interpreting and/or executing computer-readable instructions. In one example, a physical processor accesses and/or modifies one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), systems on a chip (SoCs), digital signal processors (DSPs), Neural Network Engines (NNEs), accelerators, graphics processing units (GPUs), portions of one or more of the same, variations or combinations of one or more of the same, or any other suitable physical processor.

In some implementations, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein are shown or discussed in a particular order, these steps do not necessarily need to be performed in the order illustrated or discussed. The various exemplary methods described and/or illustrated herein can also omit one or more of the steps described or illustrated herein or include additional steps in addition to those disclosed.

The preceding description has been provided to enable others skilled in the art to best utilize various aspects of the exemplary implementations disclosed herein. This exemplary description is not intended to be exhaustive or to be limited to any precise form disclosed. Many modifications and variations are possible without departing from the spirit and scope of the present disclosure. The implementations disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A device comprising:

a plurality of heterogeneous chiplets, wherein a first chiplet of the plurality of heterogeneous chiplets is configured to:

report, to a second chiplet of the plurality of heterogeneous chiplets in response to receiving an indication of the device initiating entry of a low power state, locally reaching an idle state in which local clients are idle; and in response to receiving a confirmation of the idle state from the second chiplet, locally complete the entry of the low power state.

2. The device of claim 1, wherein the first chiplet corresponds to a stutter client chiplet having an activity buffer and locally reaching the idle state includes filling the activity buffer based on a buffer threshold.

3. The device of claim 2, wherein the buffer threshold corresponds to a minimum idle period before the stutter client chiplet wakes up to refill the activity buffer.

4. The device of claim 2, wherein the stutter client chiplet corresponds to a display engine and the activity buffer corresponds to a display buffer.

5. The device of claim 2, wherein the stutter client chiplet corresponds to a multimedia engine and the activity buffer corresponds to a multimedia buffer.

6. The device of claim 2, wherein the stutter client chiplet is configured to receive an indication of the device transitioning to a partial power state in which a subset of logic components of the stutter client chiplet is active to allow filling the activity buffer, and wherein other chiplets of the plurality of heterogeneous chiplets remain idle.

7. The device of claim 6, wherein the plurality of heterogeneous chiplets are configured to abort, in response to at least one of the plurality of heterogeneous chiplets broadcasting an active state, transitioning to the partial power state while the stutter client chiplet is filling the activity buffer.

8. The device of claim 1, wherein locally reaching the idle state comprises at least one of saving a state, disabling write burst accumulation, or flushing remaining writes.

9. The device of claim 1, wherein the plurality of heterogeneous chiplets are configured to abort the entry of the low power state in response to at least one of the plurality of heterogeneous chiplets broadcasting an active state.

10. A system comprising:

a plurality of heterogeneous chiplets including a stutter client having an activity buffer; and a control circuit configured to:

in response to the system initiating entry of a low power state, confirm each of the plurality of heterogeneous chiplets has locally reached an idle state;

in response to receiving confirmations of the idle state from each of the plurality of heterogeneous chiplets, instruct the stutter client to fill the activity buffer to a buffer threshold; and in response to the stutter client filling the activity buffer, complete entry of the low power state.

11. The system of claim 10, wherein the buffer threshold corresponds to a minimum idle period before the stutter client wakes up to refill the activity buffer.

12. The system of claim 11, wherein refilling the activity buffer further comprises accessing a memory of the system.

13. The system of claim 10, wherein the stutter client corresponds to a display engine and the activity buffer corresponds to a display buffer.

14. The system of claim 10, wherein the control circuit is configured to:

receive an indication of a partial power state in which only components servicing the stutter client is active; and in response to the indication, instructing the stutter client and a corresponding link to power on, wherein other chiplets of the plurality of heterogeneous chiplets remain idle.

15. The system of claim 14, wherein the control circuit is configured to, in response to at least one of the plurality of heterogeneous chiplets broadcasting an active state, abort the partial power state.

16. The system of claim 10, wherein the control circuit is configured to abort, in response to at least one of the plurality of heterogeneous chiplets broadcasting an active state, entry of the low power state.

17. A method comprising:

transitioning a plurality of heterogeneous chiplets to a new power state that corresponds to power gating idle chiplets of the plurality of heterogeneous chiplets;

confirming, while a stutter client chiplet of the plurality of heterogeneous chiplets is kept at least partially powered on, the idle chiplets have completed operations for reaching a fabric idle state; and in response to confirmations from the idle chiplets of the idle state, completing the transition to the new power state.

18. The method of claim 17, wherein the stutter client chiplet has an activity buffer and the stutter client chiplet is kept at least partially powered on to fill the activity buffer to at least a buffer threshold.

19. The method of claim 18, further comprising aborting the transition to the new power state while the stutter client chiplet fills the activity buffer.

20. The method of claim 17, wherein the operations includes at least one of confirming corresponding local clients are idle, saving a state, flushing writes, disabling write burst accumulation, or confirming a corresponding fabric is idle.

* * * * *